(12) United States Patent
Xue

(10) Patent No.: US 12,319,791 B2
(45) Date of Patent: Jun. 3, 2025

(54) POLYBUTYLENE TEREPHTHALATE COMPOSITION AND THE MANUFACTERING METHOD THEREOF

(71) Applicant: CHANG CHUN PLASTICS CO., LTD., Taipei (TW)

(72) Inventor: Bo-Fan Xue, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 0 days.

(21) Appl. No.: 18/519,946

(22) Filed: Nov. 27, 2023

(65) Prior Publication Data
US 2025/0109271 A1    Apr. 3, 2025

(30) Foreign Application Priority Data

Sep. 28, 2023    (CN) .......................... 202311265804.X
Sep. 28, 2023    (TW) ................................. 112137326

(51) Int. Cl.
*C08J 11/24*    (2006.01)

(52) U.S. Cl.
CPC ............ *C08J 11/24* (2013.01); *C08J 2367/03* (2013.01)

(58) Field of Classification Search
USPC ........................................................ 521/48.5
See application file for complete search history.

(56) References Cited

U.S. PATENT DOCUMENTS

2009/0264611 A1* 10/2009 Hamano ................ C08G 63/85
                                                      528/308.1

FOREIGN PATENT DOCUMENTS

CN            101437868 A      5/2009

* cited by examiner

*Primary Examiner* — Terressa Boykin
(74) *Attorney, Agent, or Firm* — MUNCY, GEISSLER, OLDS & LOWE, P.C.

(57) ABSTRACT

The present invention relates to a polybutylene terephthalate composition and the manufacturing method thereof. The change rate of crystallization heat flow of the polybutylene terephthalate composition is greater than 200 mW/g-min, and the change rate of crystallization heat flow is determined according to the method of ISO 11357-3:2018. The polybutylene terephthalate composition of this invention has ideal heat resistance and low impurity content, and it is highly applicable in subsequent processing.

10 Claims, 3 Drawing Sheets

POLYBUTYLENE TEREPHTHALATE COMPOSITION AND THE MANUFACTERING METHOD THEREOF

BACKGROUND OF THE INVENTION

1. Technical Field

The present invention relates to a polybutylene terephthalate composition, in particular to an environment-friendly polybutylene terephthalate composition and a preparation method thereof, but the present application is not limited thereto.

2. Description of Related Art

Polymers with ester functional groups on the main chain are collectively referred to as polyesters, which have the characteristics of light weight, impact resistance, breakage-proof, and high transparency and can be applied to the packaging of various daily necessities for food, clothing, housing and transportation. However, a considerable percentage of polyester is used as a single-use or disposable packaging material, which has the problem of being difficult to degrade and has caused serious environmental pollution. Therefore, reusing recycled polyester products has become an important issue.

The polyester recycling methods used nowadays can be divided into physical recycling methods and chemical recycling methods. The chemical recycling method is to depolymerize polyesters under certain reaction conditions to obtain basic monomers or oligomers of polyesters, then separate and purify them, and then carry out repolymerization to produce new polymers, especially produce widely used poly butylene terephthalate (PBT). Furthermore, the chemical recycling method can be subdivided into hydrolysis method, alcoholysis method and supercritical fluid method.

Prior art such as Chinese Invention Patent Publication No. 114805766 discloses a method for preparing PBT from waste (recycled) PET and/or PBT, and the method includes the following steps: melting PET and/or PET-PBT mixed polyester into a melt, adding a depolymerization solution, and carrying out depolymerization in a depolymerization kettle to obtain BHET and BHBT monomers, wherein the depolymerization solution includes 1,4-butanediol (1,4-BDO) or/and ethylene glycol (EG); carrying out transesterification reaction of the BHET and BHBT monomers with methanol to obtain a dimethyl terephthalate (DMT) solution, and then purifying and refining the DMT solution to obtain refined DMT; carrying out transesterification reaction of the refined DMT with BDO to obtain BHBT; and polycondensing the BHBT to generate the polymer PBT.

BRIEF SUMMARY OF THE INVENTION

In the prior art, in a case where recycled polyester is used to reproduce polybutylene terephthalate (hereinafter referred to as PBT) composition, the finished product usually contains more impurities and has poor heat resistance. In this regard, it is found that controlling the change rate of crystallization heat flow of the PBT composition within a specific range can comply with the trend of environmental friendliness and also make the PBT composition have good heat resistance and low impurity content.

Specifically, one aspect of the present invention provides a PBT composition, obtained by alcoholyzing a recycled polyester having a structure of formula (i):

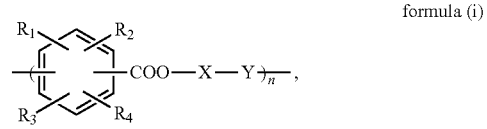

formula (i)

where $R_1$, $R_2$, $R_3$ and $R_4$ are the same or different, and are hydrogen, alkyl having one to six carbon atoms, halogen, alkoxy having one to six carbon atoms, alkoxycarbonyl having two to six carbon atoms, nitrile, amino, sulfonyl, nitro or phenoxy, respectively; X is a divalent aliphatic hydrocarbyl having one to ten carbon atoms; Y is —OCO— or —O—; and n is an integer between 30 and 500; wherein, the change rate of crystallization heat flow of the composition is greater than or equal to 200 mW/g-min, and the change rate of crystallization heat flow is measured according to a method set forth in ISO11357-3:2018.

In one or more embodiments, the composition has a change rate of crystallization heat flow of 200 mW/g-min to 2300 mW/g-min.

In one or more embodiments, the recycled polyester is polyethylene terephthalate, polytrimethylene terephthalate, or polybutylene terephthalate.

In one or more embodiments, the crystallization temperature (Tc) of the PBT composition is higher than 183° C.

In one or more embodiments the composition comprises less than 0.1 mol % of ethylene glycol (EG) residue.

In one or more embodiments, the composition comprises less than 0.1 mol % of diethylene glycol (DEG) residue.

In one or more embodiments, the intrinsic viscosity (IV) of the composition is within a range of 0.5 dL/g to 1.5 dL/g.

Another aspect of the present invention provides a method for forming a PBT composition from a recycled polyester, including the following steps: (1) providing the recycled polyester having a structure of formula (i),

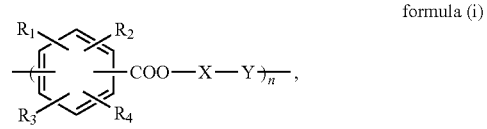

formula (i)

where $R_1$, $R_2$, $R_3$ and $R_4$ are the same or different, and are hydrogen, alkyl having one to six carbon atoms, halogen, alkoxy having one to six carbon atoms, alkoxycarbonyl having two to six carbon atoms, nitrile, amino, sulfonyl, nitro or phenoxy, respectively; X is a divalent aliphatic hydrocarbyl having one to ten carbon atoms; Y is —OCO— or —O—; and n is an integer between 30 and 500; (2) adding an alcohol to alcoholyze the recycled polyester into an oligomer or a monomer; (3) under a negative pressure, adding 1,4-BDO in portions to carry out transesterification reaction with the oligomer to obtain a butylene terephthalate prepolymer (bis(2-hydroxylbutyl) terephalate, BHBT); and (4) at a pressure of less than 1.5 mbar, polymerizing the BHBT to obtain the PBT composition, wherein the change rate of crystallization heat flow of the PBT composition is greater than or equal to 200 mW/g-min, and the change rate of crystallization heat flow is measured according to a method set forth in ISO11357-3:2018.

In one or more embodiments, in step (3), 1,4-BDO is added in 2 to 4 portions under the negative pressure to carry out transesterification reaction with the oligomer.

In one or more embodiments, the recycled polyester is polyethylene terephthalate, polytrimethylene terephthalate, or polybutylene terephthalate.

The PBT composition of the present invention belongs to a post-consumer recycled resin (PCR) that conforms to the trend of environmentally friendly recycling and has ideal heat resistance and low impurity content, so it has good applicability in subsequent processing.

BRIEF DESCRIPTION OF THE SEVERAL VIEWS OF THE DRAWINGS

FIG. 1 shows the structure of PET, and the signal i represents the residual EG component that participates in polymerization; FIG. 2 shows the structure of poly (diethylene glycol terephthalate (PDET), and the signal k represents the structure of DEG; FIG. 3 shows the structure of PBT, the signal a represents the structure of PBT, and the signal a' represents the structure of a terminal alcohol group in the structure of PBT.

FIG. 4 is a schematic diagram for analyzing the change rate of crystallization heat flow, and FIG. 5 is a schematic diagram for analyzing crystallization temperature.

DETAILED DESCRIPTION OF THE INVENTION

Figure 1:
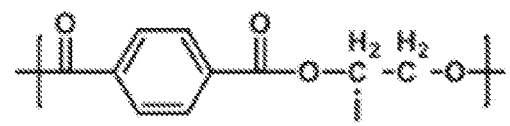
FIGS. 1 to 3 are schematic diagrams for analyzing structural signals in impurity analysis according to an embodiment of the present invention, where

In order to make the description of the present invention more detailed and complete, the following provides an illustrative description of the implementation and specific embodiments of the present invention, but this is not the only form for implementing or applying the specific embodiments of the present invention. In this description and the appended claims, unless the context indicates otherwise, "a" and "the" may also be construed as plural.

Although the numerical ranges and parameters used to define the present invention are approximate numerical values, the relevant numerical values in the specific embodiments are presented here as precisely as possible. Any numerical value, however, inherently and inevitably includes standard deviations resulting from individual testing methods. As used herein, the term "about" means that the actual value falls within an acceptable standard error of the mean, which is considered by those skilled in the art to which the present invention pertains.

As used herein, a dash "-" not between two words or symbols is used to indicate a point of attachment of a substituent; for example, the dash in —(C=O)CH₃ indicates attachment at the carbon of a carbonyl (CO).

PBT Composition

One aspect of the present invention provides a PBT composition, obtained by alcoholyzing a recycled polyester, and the change rate of crystallization heat flow of the composition is greater than or equal to 200 mW/g-min.

The "recycled polyester" refers to a recycled polyester composition having a structure of formula (i):

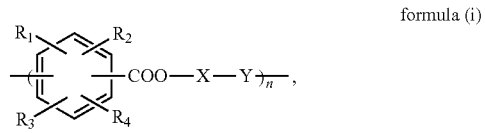

where $R_1$, $R_2$, $R_3$ and $R_4$ are the same or different, and are hydrogen, alkyl having one to six carbon atoms, halogen, alkoxy having one to six carbon atoms, alkoxycarbonyl having two to six carbon atoms, nitrile, amino, sulfonyl, nitro or phenoxy, respectively; the alkyl is such as but not limited to methyl, ethyl, n-propyl, isopropyl, isobutyl, n-butyl, sec-butyl, tert-butyl, isopentyl, n-pentyl, neopentyl or n-hexyl; the halogen is such as but not limited to fluorine, chlorine or bromine; the alkoxy is such as but not limited to methoxy, ethoxy, n-propoxy, isopropoxy, isobutoxy, n-butoxy, sec-butoxy, tert-butoxy, isopentyloxy, n-pentoxy, neopentoxy or n-hexyloxy; the alkoxycarbonyl is such as but not limited to methoxycarbonyl, ethoxycarbonyl, n-propoxycarbonyl, isopropoxycarbonyl, n-butoxycarbonyl, isobutoxycarbonyl, sec-butoxycarbonyl, tert-butoxycarbonyl, n-pentyloxycarbonyl, isopentyloxycarbonyl or neopentyloxycarbonyl. X is a divalent aliphatic hydrocarbyl having one to ten carbon atoms, such as but not limited to methylene, dimethylene, trimethylene, tetramethylene, pentamethylene, hexamethylene, heptamethylene, octamethylene, nonamethylene, decamethylene, ethylene, propylene, methyltrimethylene or butene; Y is —OCO— or —O—; and n is an integer between 30 and 500, such as an integer between 50 and 70 or an integer between 100 and 200, specifically but not limited to 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500.

According to some preferred embodiments of the present invention, the recycled polyester is recycled polyethylene terephthalate (PET), polytrimethylene terephthalate (PTT), or polybutylene terephthalate (PBT); more preferably, the recycled polyester is recycled PET or PBT. According to some preferred embodiments of the present invention, in the PBT composition of the present invention, the content of the recycled polyester component (i.e., PCR content) reaches 5-80 wt %, such as but not limited to 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, or 80 wt %, preferably, 60 wt %. Other components are such as but not limited to other components added in the preparation method and required for alcoholysis and transesterification of the recycled polyester component. Other additional components needed in the subsequent process of forming a product, such as additives, modifiers or reinforcing agents, may also be added to provide a wide range of properties. Additives include, for example, stabilizers (e.g., ultraviolet absorbers), antioxidants, heat stabilizers, lubricants, release agents, catalyst deactivators, nucleating agents, crystallization accelerators, and the like.

The "change rate of crystallization heat flow" is a parameter measured according to a standard method set forth in ISO11357-3:2018. This standard method specifies a method for determining the melting and crystallization temperatures and crystallization enthalpy of crystalline or partially crystalline plastics. The method is based on differential scanning calorimetry (DCS) for analysis, and more specifically, in this method, taking the heat flow (expressed as, for example, W/g) as a vertical axis and time (expressed as, for example, min) as a horizontal axis, the change of crystallization enthalpy (ΔHc) of the PBT composition is measured in a heating mode to draw a crystallization heat flow change curve, and then the slope of the exothermic crystallization peak can be calculated to obtain the change rate of crystallization heat flow. More specifically, the heat flow is a ratio of heat transfer rate to material mass, wherein the heat transfer rate refers to the amount of heat transferred from one object to another per unit time. Without being bound by a particular theory, it is found that the change rate of crystallization heat flow is a parameter that can be controlled by the preparation conditions of the PBT composition.

It is found that when the change rate of crystallization heat flow is controlled within a specific range, the heat resistance properties of the PBT composition need to be improved. Specifically, the change rate of crystallization heat flow of the PBT composition of the present invention, measured according to the method set forth in ISO11357-3:2018, is greater than or equal to 200 mW/g-min, such as but not limited to greater than or equal to 200 mW/g-min, greater than or equal to 400 mW/g-min, greater than or equal to 600 mW/g-min, greater than or equal to 800 mW/g-min, greater than or equal to 1000 mW/g-min, greater than or equal to 1200 mW/g-min, greater than or equal to 1400 mW/g-min, greater than or equal to 1600 mW/g-min, greater than or equal to 1800 mW/g-min, greater than or equal to 2000 mW/g-min, greater than or equal to 2200 mW/g-min, or greater than or equal to 2400 mW/g-min; preferably, the change rate of crystallization heat flow of the PBT composition ranges from 200 mW/g-min to 2300 mW/g-min.

In some embodiments of the present invention, the crystallization temperature of the PBT composition of the present invention is higher than 183° C.; specifically, it is higher than 183° C., higher than 184° C., higher than 185° C., higher than 186° C., higher than 187° C., higher than 188° C., higher than 189° C., higher than 190° C., or higher than 191° C. Without being bound by a specific theory, it is believed that when the crystallization temperature of the PBT composition is higher than 183° C., the PBT composition can further exhibit good heat resistance properties in the subsequent processing.

As used herein, "ethylene glycol (EG) residue" and "diethylene glycol (DEG) residue" are impurities commonly found in PBT compositions formed by alcoholysis of recycled polyester. When the content of these impurities is too high, the processability of the PBT compositions will be reduced, thereby affecting the applicability. Therefore, in order to provide a PBT composition with better processability, according to some embodiments of the present invention, the PBT composition comprises less than 0.1 mol % of EG residue or comprises less than 0.1 mol % of DEG residue. Specifically, the PBT composition of the present invention comprises, for example, less than 0.1 mol %, less than 0.09 mol %, less than 0.08 mol %, less than 0.07 mol %, less than 0.06 mol %, less than 0.05 mol %, less than 0.04 mol %, less than 0.03 mol %, or less than 0.02 mol % of EG residue or DEG residue; preferably, the PBT composition comprises less than 0.1 mol % of EG residue and 0.1 mol % of DEG residue.

According to some embodiments of the present invention, the intrinsic viscosity (IV) of the PBT composition is within a range of 0.5 to 1.5; specifically, the intrinsic viscosity is, for example, between any two of 0.5, 0.6, 0.7, 0.8, 0.9, 1.0, 1.1, 1.2, 1.3, 1.4 and 1.5. Compared with conventional resins that may have low intrinsic viscosity, the intrinsic viscosity of the PBT composition of the present invention is high enough to ensure its applicability in subsequent processing.

According to some embodiments of the present invention, the carboxyl end group (CEG) content of the PBT composition is less than 50 meq/Kg relative to the weight of its PBT composition. Specifically, it is, for example, less than 50 meq/Kg, less than 40 meq/Kg, less than 30 meq/Kg, less than 20 meq/Kg, or less than 10 meq/Kg. Specifically, the CEG content of the present invention ranges from 15 meq/Kg to 21 meq/Kg relative to the weight of the PBT composition. Compared with conventional polyesters with a high CEG content, the PBT composition of the present invention has low CEG content, is more resistant to hydrolysis and is less likely to be degraded in high temperature and high humidity environments, and has better mechanical strength, thereby ensuring the applicability of the PBT composition in subsequent processing Specifically, the PBT composition is further formed into a molded product. The molded product can be applied to, including but not limited to, electronic products (such as laptop cases, keyboard and mouse cases, etc.), bottle containers, packaging materials, materials of automobiles and their parts, sole base material, etc., or the molded product is woven into polyester fiber, which is used for garments, curtains, etc.

Preparation Method of PBT Composition

Another aspect of the present invention provides a method for forming a PBT composition from a recycled polyester, including: (1) providing the recycled polyester; (2) adding an alcohol to alcoholyze the recycled polyester into an oligomer or a monomer; (3) under a negative pressure, adding 1,4-BDO in portions to carry out transesterification reaction with the oligomer to obtain a butylene terephthalate prepolymer, which is bis(2-hydroxylbutyl) terephthalate (BHBT); and (4) at a pressure of less than 1.5 mbar, polymerizing the BHBT to obtain the PBT composition, wherein the change rate of crystallization heat flow of the PBT composition is greater than or equal to 200 mW/g-min, and the change rate of crystallization heat flow is measured according to a method set forth in ISO11357-3:2018.

Specifically, the recycled polyester has a structure of formula (i):

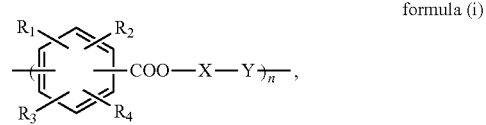

formula (i)

where $R_1$, $R_2$, $R_3$ and $R_4$ are the same or different, and are hydrogen, alkyl having one to six carbon atoms, halogen, alkoxy having one to six carbon atoms, alkoxycarbonyl having two to six carbon atoms, nitrile, amino, sulfonyl, nitro or phenoxy, respectively; the alkyl is such as but not limited to methyl, ethyl, n-propyl, isopropyl, isobutyl, n-butyl, sec-butyl, tert-butyl, isopentyl, n-pentyl, neopentyl or n-hexyl; the halogen is such as but not limited to fluorine, chlorine or bromine; the alkoxy is such as but not limited to methoxy, ethoxy, n-propoxy, isopropoxy, isobutoxy, n-butoxy, sec-butoxy, tert-butoxy, isopentyloxy, n-pentoxy, neopentoxy or n-hexyloxy; the alkoxycarbonyl is such as but not limited to methoxycarbonyl, ethoxycarbonyl, n-propoxycarbonyl, isopropoxycarbonyl, n-butoxycarbonyl, isobutoxycarbonyl, sec-butoxycarbonyl, tert-butoxycarbonyl, n-pentyloxycarbonyl, isopentyloxycarbonyl or neopentyloxycarbonyl. X is a divalent aliphatic hydrocarbyl having one to ten carbon atoms, such as but not limited to methylene, dimethylene, trimethylene, tetramethylene, pentamethylene, hexamethylene, heptamethylene, octamethylene, nonamethylene, decamethylene, ethylene, propylene, methyltrimethylene or butene; Y is —OCO— or —O—; and n is an integer between 30 and 500, such as an integer between 50 and 70 or an integer between 100 and 200.

According to some preferred embodiments of the present invention, the recycled polyester is recycled polyethylene terephthalate (PET), polytrimethylene terephthalate (PTT), or polybutylene terephthalate (PBT); more preferably, the recycled polyester is recycled PET or PBT.

The "alcohol" used herein refers to the alcohol that can alcoholyze the recycled polyester into an oligomer or a monomer and function as a dechaining agent for decomposing polyester chains. The "alcohol" usually refers to a low molecular weight alcohol, such as but not limited to methanol, ethylene glycol, 1,4-BDO, etc. In a preferred embodiment, the alcohol is 1,4-BDO or methanol.

The "oligomer" used herein is also called a low polymer, and refers to a polymer composed of fewer repeating units. In step (2) of the method of the present invention, the recycled polyester reacts with an alcohol, so that the recycled polyester is alcoholyzed into an oligomer or a monomer, so as to facilitate the subsequent transesterification reaction, where the conditions of the aforementioned alcoholysis reaction are not limited herein.

In step (3), under a negative pressure condition, 1,4-BDO is added in portions to the oligomer to carry out transesterification reaction to obtain BHBT. Specifically, the 1,4-BDO is added in at least 2 portions (i.e., the number of transesterification reactions). Without being bound by a specific theory, adding 1,4-BDO in portions is one of the variables that control the change rate of crystallization heat flow within a desired range, and preferably the 1,4-BDO is added in 2 to 4 portions, more preferably in 2 portions. The pressure condition of "negative pressure" refers to a pressure condition of lower than atmospheric pressure (i.e., 1013 mbar), such as lower than 1013 mbar, lower than 800 mbar, lower than 600 mbar, lower than 400 mbar or lower than 200 mbar. Without being bound by a specific theory, the pressure condition of negative pressure is one of the variables that control the change rate of crystallization heat flow within a desired range, and the negative pressure is preferably 145 mbar or 100 mbar. The "prepolymer" refers to a substance formed by preliminary polymerization of a monomer or an oligomer. When it is difficult to completely polymerize a monomer or oligomer into a polymer at one time, a prepolymer can be formed first to facilitate subsequent polymerization. In the above-mentioned transesterification and polymerization reactions, a catalyst may be added. For example, at least one catalyst of manganese acetate, calcium acetate and zinc acetate functions as a catalyst for the transesterification reaction, and a catalyst available for the polymerization reaction, such as antimony trioxide, n-butyl titanate, n-butyltin hydroxide or monobutyltin tris (2-ethylhexanoate), etc.

Without being limited by a specific theory, the pressure condition for the polymerization of BHBT in step (4) is one of the variables that control the change rate of crystallization heat flow within a desired range. Preferably, the pressure condition refers to a pressure condition of high vacuum, for example, 0.5, 1, 1.5 or 2 mbar, more preferably less than 1.5 mbar.

EXAMPLES

The present invention will be further described below in detail and specific examples. However, it should be appreciated that these specific examples are only used to help understand the present invention more easily and are not intended to limit the scope of the present invention.

1. Preparation Method of PBT Composition

The present invention provides the preparation methods of the PBT composition of Examples 1 to 8 and Comparative Example 1 to 4.

The following are the main steps of preparing the PBT composition in the Examples and the Comparative Examples, and the following table 1 will present the differences in one or more process parameters between the Examples and the Comparative Examples in detail.

First, recycled PET had an alcoholysis with 1,4-BDO of a specific equivalent number (specifically as shown in Examples 1 to 7 and Comparative Examples 1 to 4 in Table 1) or with methanol (MeOH) of a specific equivalent number (specifically as shown in Example 8 in Table 1) to obtain an oligomer or monomer. Then, under a specific pressure condition (specifically as shown in Table 1), 1,4-BDO of a specific equivalent number (specifically as shown in Table 1) was added in portions (specifically as shown in Table 1) in the oligomer to carry out transesterification reaction (the reaction time is specifically as shown in Table 1) to obtain BHBT. Finally, the BHBT was polymerized under a pressure condition of less than 1.5 mbar (i.e., high-vacuum state) to form the PBT composition. In addition, Comparative Example 4 was carried out under the same conditions as in Example 4 of U.S. Pat. No. 5,266,601.

TABLE 1

| Description | Example 1 | Example 2 | Example 3 | Example 4 | Example 5 | Example 6 | Example 7 | Example 8 |
|---|---|---|---|---|---|---|---|---|
| Equivalent number (eq.) of 1,4-BDO for alcoholysis | 0.5 | 0.5 | 0.5 | 0.5 | 0.5 | 0.5 | 0.5 | — |
| Equivalent number (eq.) of methanol for alcoholysis | — | — | — | — | — | — | — | 2.0 |
| Equivalent number (eq.) of 1,4-BDO for transesterification reaction | 3.0 | 3.0 | 3.0 | 3.0 | 2.5 | 3.0 | 3.0 | 3.0 |

TABLE 1-continued

| Description | | | | | | | | |
|---|---|---|---|---|---|---|---|---|
| Number of transesterification reactions | 2 | 3 | 4 | 2 | 2 | 3 | 3 | 3 |
| Time of first transesterification reaction (min) | 60 | 60 | 60 | 90 | 60 | 60 | 60 | 30 |
| Time of second transesterification reaction (min) | 90 | 60 | 60 | 60 | 90 | 90 | 90 | 60 |
| Time of third transesterification reaction (min) | — | 60 | 60 | — | — | 30 | 60 | 90 |
| Time of fourth transesterification reaction (min) | — | — | 60 | — | — | — | — | — |
| Pressure condition of transesterification reaction (mbar) | 145 | 145 | 145 | 145 | 145 | 100 | 100 | 100 |

| Description | Comparative Example 1 | Comparative Example 2 | Comparative Example 3 | Comparative Example 4 |
|---|---|---|---|---|
| Equivalent number (eq.) of 1,4-BDO for alcoholysis | 0.5 | 0.5 | 2.9 | 1.0 |
| Equivalent number (eq.) of methanol for alcoholysis | — | — | — | — |
| Equivalent number (eq.) of 1,4-BDO for transesterification reaction | 2.5 | 2.0 | 0 | 1.5 |
| Number of transesterification reactions | 1 | 1 | 0 | 1 |
| Time of first transesterification reaction (min) | 150 | 150 | — | 150 |
| Time of second transesterification reaction (min) | — | — | — | — |
| Time of third transesterification reaction (min) | — | — | — | — |
| Time of fourth transesterification reaction (min) | — | — | — | — |
| Pressure condition of transesterification reaction (mbar) | 1013 | 1013 | — | 250 |

2. Analysis Method

Here, the present invention provides analysis and measurement methods of the PBT compositions of the above-mentioned Examples 1 to 8 and Comparative Examples 1 to 4.

Intrinsic Viscosity Analysis

The analysis system for intrinsic viscosity of the present invention carries out measurement according to a standard method set forth in ASTM D4603.

CEG Content Analysis

The CEG content of the present invention is measured by titration. A solution of the PBT composition dissolved in o-cresol was titrated with an ethanol solution of potassium hydroxide (the concentration of potassium hydroxide is 0.05M), where the solution contained potassium chloride (KCl) with a concentration of 0.01M.

Impurity Analysis

Figure 2:
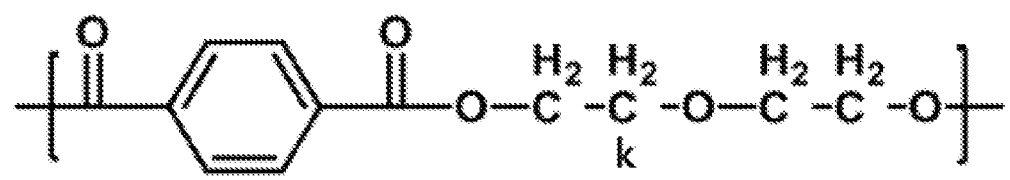
Figure 3:
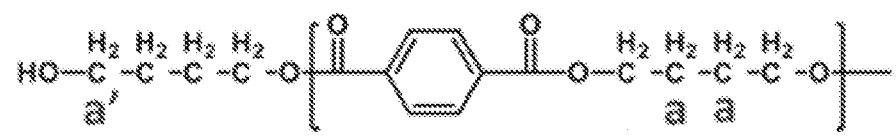

1. Sample preparation: the PBT composition was dissolved in a mixed solution of deuterated chloroform/deuterated trifluoroacetic acid (v/v=3/1) at a concentration of 10 mg/mL.
2. Analytical Instrument: 1H-NMR (400 MHZ)
3. Analysis method: Please refer to FIG. 1, where i represents the structural signal of the EG residue remaining in the PET structural signal and participating in the polymerization, its chemical shift is between 4.82 ppm and 4.78 ppm, and the number of hydrogens is 4. Please refer to FIG. 2, where k represents the structural signal of the DEG residue remaining in the PET structural signal and participating in the polymerization, its chemical shift is between 4.16 ppm and 4.06 ppm, and the number of hydrogens is 4. Please refer to FIG. 3, where a represents the structural signal of PBT, its chemical shift is between 2.16 ppm and 1.96 ppm, and the number of hydrogens is 4; a' represents the structural signal of the terminal alcohol group in the PBT structure, and its chemical shift is between 3.93 ppm and 3.83 ppm, the number of hydrogens is 2. The above are the structural signals of all diol structures in the product, and the ratios of EG and DEG residues in all diol structures are calculated according to the following formulas:

$$EG \text{ residue (mol \%)} = \frac{\frac{Ii}{4}}{\frac{Ii}{4} + \frac{Ik}{4} + \frac{Ia'}{2} + \frac{Ia}{4}} \times 100\%$$

$$DEG \text{ residue (mol \%)} = \frac{\frac{Ik}{4}}{\frac{Ii}{4} + \frac{Ik}{4} + \frac{Ia'}{2} + \frac{Ia}{4}} \times 100\%$$

where $I_i$, $I_k$, $I_a'$ and $I_a$ represent the signal values of the corresponding symbols, respectively.

DSC Analysis

Figure 4:
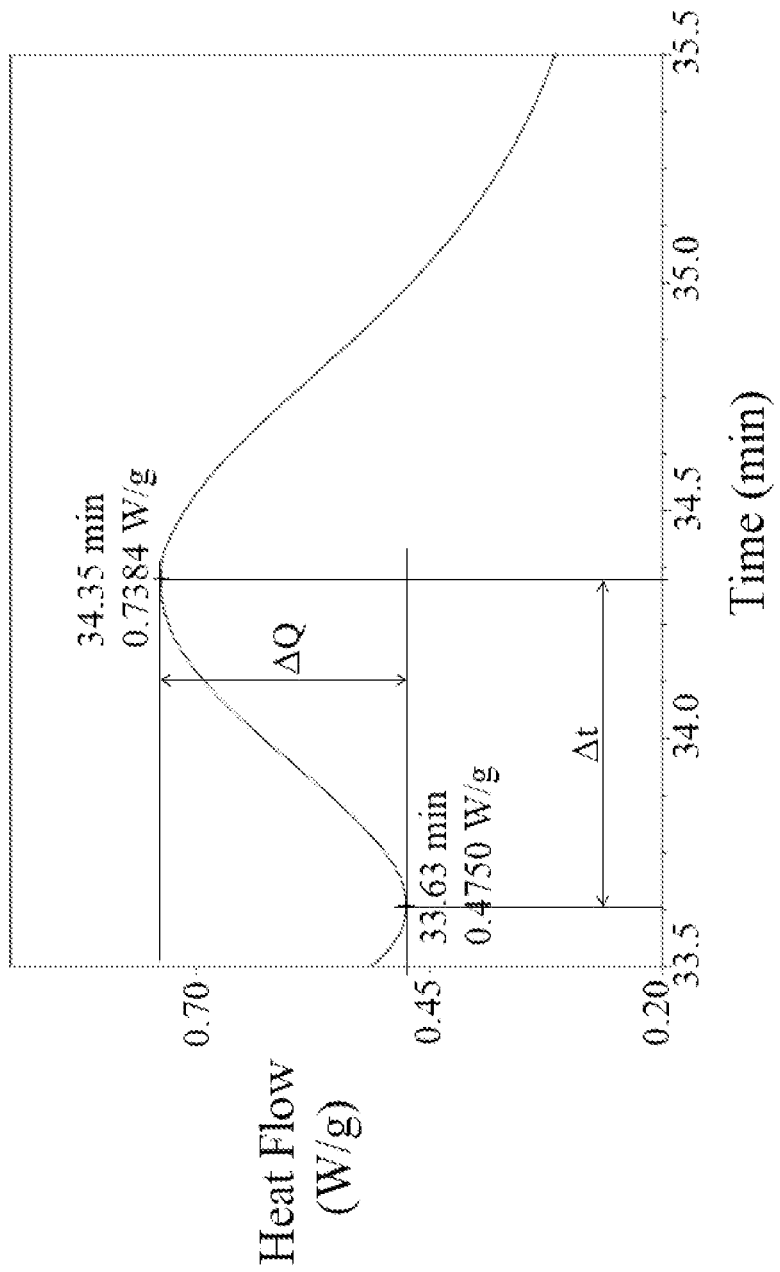
FIGS. 4 and 5 are schematic diagrams of DSC analysis results according to Example 1 of the present invention, where

1. Standard method: The change rate of crystallization heat flow and the crystallization temperature were determined according to the standard method set forth in ISO11357-3:2018.
2. Analytical instrument: Differential scanning calorimeter for differential scanning calorimetry (DSC)
3. Analysis steps a. Change Rate of Crystallization Heat Flow Step 1, 10±0.2 mg of a sample (PBT composition) in an aluminum carrier plate was placed into the DSC analyzer, and a crystallization heat flow change curve was made with the heat flow (W/g) versus time (min), where the temperature and the time were controlled specifically according to steps 2 to 5 described below; step 2, the sample was then heated to 280° C. at a heating rate of 10° C./min and held at this temperature for 3 min; step 3, the sample was then cooled to 189° C. at a cooling rate of 5° C./min; step 4, the sample was held at the temperature of 189° C. for 30 min, and the change rate of crystallization heat flow was calculated; and step 5, the sample was then cooled to 0° C. at a cooling rate of 10° C./min to complete the analysis. Please refer to FIG. 4 for the specific method of calculating the change rate of crystallization heat flow in step 4, where the peak represents the crystallization process of the sample, and the slope (that is, crystallization heat flow/time) of the exothermic peak in the event of heat release is the change rate of crystallization heat flow and can be calculated according to the following formula:

$$\text{Change rate of crystallization heat flow (mW/g} - \text{min)} = \frac{\Delta Q}{\Delta t} \times 1000$$

b. Crystallization Temperature

Figure 5:
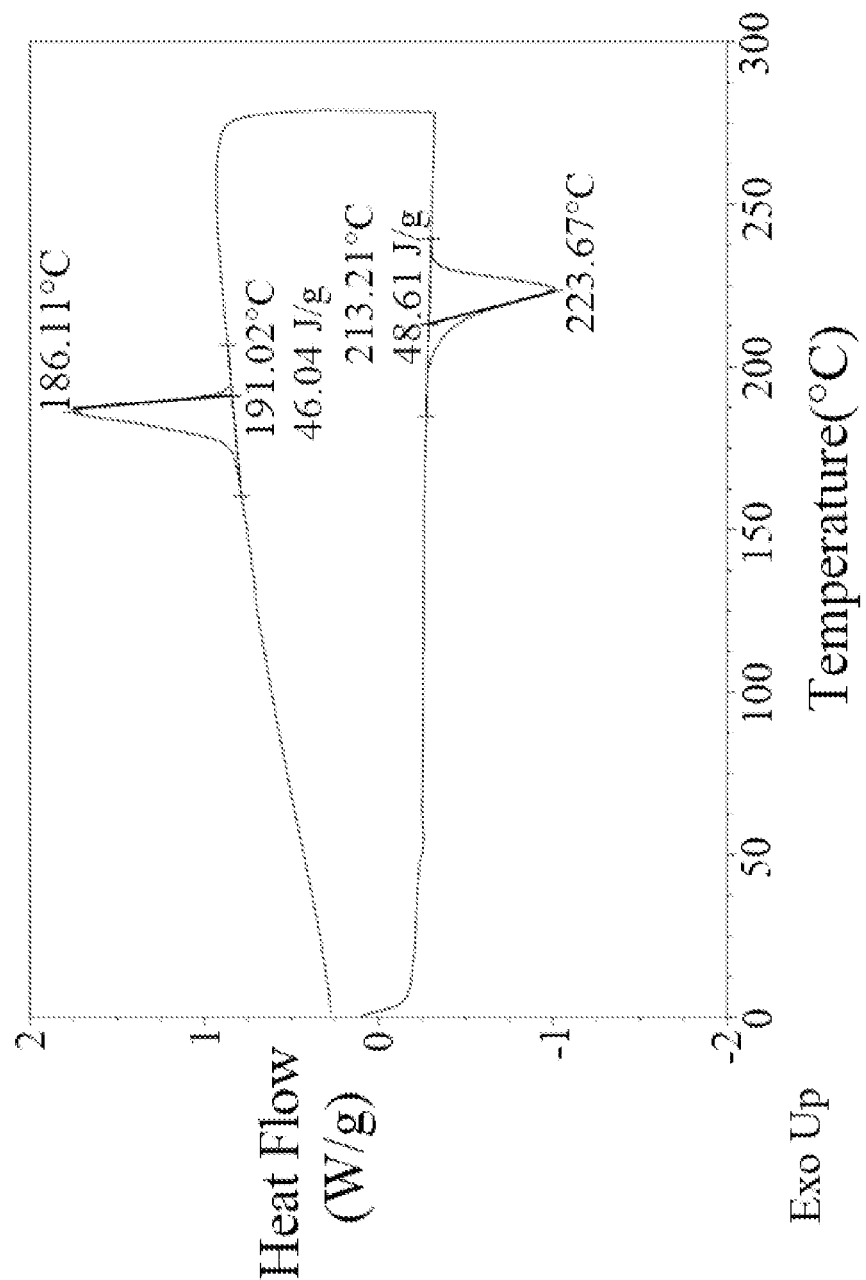

Step 1, 10±0.2 mg of a sample (PBT composition) in an aluminum carrier plate was placed into the DSC analyzer, and a curve was made with the heat flow (W/g) versus temperature (° C.), where the temperature and the temperature were controlled specifically according to steps 2 to 4 described below; step 2, the sample was then heated to 280° C. at a heating rate of 10° C./min; step 3, the sample was held at the temperature of 280° C. for 2 min; and step 4, the sample was then cooled to 0° C. at a cooling rate of 10° C./min to complete the analysis. According to the graph drawn by the above steps (see FIG. 5 for example), the peak temperature of the exothermic peak that appears during the cooling process is the crystallization temperature (e.g., 186.11° C. in FIG. 5).

3. Evaluation Method and Results

Heat Deflection Testing (HDT) Evaluation

1. Standard method: The analysis was carried out according to the standard methods set forth in ISO 75-1 and ISO 75-2.
2. Analytical instrument: TOYOSEIKI No. 533 HDT Tester
3. Analysis conditions: The HDT temperatures of the sample were measured under bending stresses of 0.45 MPa and 1.8 MPa respectively and recorded. Since the general heating deflection temperature (hereinafter referred to as HDT temperature) is related to the environmental pressure or load of the material (sample), when the HDT of the material is analyzed according to the standard methods set forth in ASTMD648 or ISO75-1 and ISO75-2, the HDT temperatures of the material under bending stresses of 0.45 MPa (simulating the case of no pressure load) and 1.8 MPa (simulating the case of a certain pressure load) are always tested, in order to better describe the heat resistance of the material. In addition, generally, the HDT temperature measured under the bending stress of 0.45 MPa will be higher than that measured under the bending stress of 1.8 MPa. The higher the HDT temperature measured under the same conditions, the better the heat resistance of the material under the conditions.
4. Analysis steps:

Step 1, the sample particles were dried at 140° C. for 3 h, where the sample particle is PBT composition containing 30 wt. % glass fibers to simulate the conditions of the back-end application of the PBT composition; step 2, the sample particles were dried and molded into ISO standard test pieces (80 mm*10 mm*4 mm); step 3, the sample test pieces were placed in an environment with a temperature of 23±2° C. and a relative humidity (RH) of 50±5% for at least 40 h; step 4, the sample test pieces were annealed at 190° C. for 2 h and then rested to cool down to room temperature; step 5, the annealed sample test pieces were placed into the analytical instrument with set parameters (maximum temperature, pressure load); and step 6, when the sample test pieces reached the amount of deflection, the analytical instrument automatically stopped and cooled down, and at least two data were obtained for one sample to be averaged.

Further, the intrinsic viscosity, CEG content, EG residue, DEG residue, crystallization temperature, PCR degree, change rate of crystallization heat flow rate and plastic HDT evaluation results of PBT compositions in Examples 1 to 8 and Comparative Examples 1 to 4 of the present application are all presented in Table 2.

TABLE 2

| Description | Example 1 | Example 2 | Example 3 | Example 4 | Example 5 | Example 6 | Example 7 | Example 8 |
|---|---|---|---|---|---|---|---|---|
| IV (dL/g) | 1.3154 | 1.2068 | 1.3207 | 1.1846 | 1.1270 | 0.8707 | 0.8335 | 1.0975 |
| CEG content (meq/Kg) | 16.65 | 15.82 | 20.87 | 15.70 | 18.05 | 19.71 | 20.72 | 20.69 |
| EG residue (mol %) | 0.025 | 0.035 | 0.015 | 0.030 | 0.075 | 0.020 | 0.010 | 0.010 |
| DEG residue (mol %) | 0.065 | 0.090 | 0.080 | 0.050 | 0.065 | 0.030 | 0.020 | 0.010 |

TABLE 2-continued

| | | | | | | | | |
|---|---|---|---|---|---|---|---|---|
| Tc (° C.) | 186.11 | 184.25 | 185.28 | 184.83 | 184.78 | 188.81 | 191.76 | 185.87 |
| PCR degree (wt. %) | 60 | 60 | 60 | 60 | 60 | 60 | 60 | 60 |
| Change rate of crystallization heat flow (mW/g-min) | 365.83 | 493.40 | 683.30 | 922.80 | 739.30 | 1659.30 | 2279.00 | 792.75 |
| HDT temperature (° C.) under 1.8 MPa | 199.9 | 200.6 | 201.2 | 202.6 | 201.0 | 203.1 | 203.9 | 201.5 |
| HDT temperature (° C.) under 0.45 MPa | 217.7 | 218.5 | 219.3 | 220.9 | 218.9 | 220.2 | 221.8 | 219.9 |

| Description | Comparative Example 1 | Comparative Example 2 | Comparative Example 3 | Comparative Example 4 |
|---|---|---|---|---|
| IV (dL/g) | 1.1148 | 1.0235 | 1.1030 | 1.1010 |
| CEG content (meq/Kg) | 16.71 | 17.03 | 19.02 | 20.69 |
| EG residue (mol %) | 2.75 | 6.30 | 2.77 | 2.43 |
| DEG residue (mol %) | 0.95 | 2.75 | 0.91 | 0.80 |
| Tc (° C.) | 172.23 | 157.15 | 174.25 | 176.30 |
| PCR degree (wt. %) | 60 | 60 | 60 | 60 |
| Change rate of crystallization heat flow (mW/g-min) | 195.04 | 156.36 | 165.80 | 196.20 |
| HDT temperature (° C.) under 1.8 MPa | 196.2 | 195.5 | 196.1 | 196.4 |
| HDT temperature (° C.) under 0.45 MPa | 213.8 | 213.1 | 213.7 | 214.3 |

From Table 2, it can be seen that the change rate of crystallization heat flow of the PBT compositions in Examples 1 to 8 are all greater than or equal to 200 mW/g-min. It is observed that the HDT temperatures of these PBT compositions under the two conditions of 1.8 MPa and 0.45 MPa are respectively higher than those of Comparative Examples 1 to 4 in which the change rate of crystallization heat flow is not within an expected range. It thus can be seen that only by controlling the change rate of crystallization heat flow of the PBT composition to be greater than or equal to 200 mW/g-min, can the heat resistance of the PBT composition be improved. In addition, it can also be understood from the data of Table 2 that the PBT compositions of the examples of the present invention conform to the trend of environmental friendliness and also have a low impurity content and good processing applicability (for example but not limited to: ideal intrinsic viscosity and CEG content value).

To sum up, the PBT composition of the present invention belongs to a post-consumer recycled resin (PCR) that conforms to the trend of environmentally friendly recycling and has ideal heat resistance and low impurity content, so it has good applicability in subsequent processing.

All ranges provided herein are intended to include each specific range within the given ranges as well as combinations of subranges within the given ranges. Additionally, unless otherwise stated, all ranges provided herein include the endpoints of the said ranges. Therefore, the range of 1 to 5 specifically includes 1, 2, 3, 4, and 5, and subranges, such as, of 2 to 5, 3 to 5, 2 to 3, 2 to 4, 1 to 4, and the like.

All publications and patent applications cited in the description are incorporated herein by reference, and for any and all purposes, each individual publication or patent application is specifically and individually indicated to be incorporated herein by reference. In the event of any inconsistency between this description and any publication or patent application incorporated herein by reference, this description shall prevail.

What is claimed is:

1. A polybutylene terephthalate (PBT) composition, obtained by alcoholyzing a recycled polyester having a structure of formula (i):

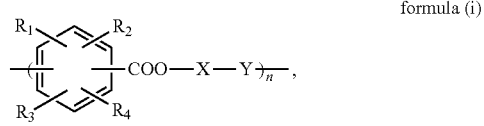

formula (i)

where $R_1$, $R_2$, $R_3$ and $R_4$ are the same or different and are hydrogen, alkyl having one to six carbon atoms, halogen, alkoxy having one to six carbon atoms, alkoxycarbonyl having two to six carbon atoms, nitrile, amino, sulfonyl, nitro or phenoxy, respectively; X is a divalent aliphatic hydrocarbyl having one to ten carbon atoms; Y is —OCO— or —O—; and n is an integer between 30 and 500;
   wherein, the change rate of crystallization heat flow of the composition is greater than or equal to 200 mW/g-min, and the change rate of crystallization heat flow is measured according to a method set forth in ISO11357-3:2018.

2. The PBT composition according to claim 1, wherein the composition has a change rate of crystallization heat flow of 200 mW/g-min to 2300 mW/g-min.

3. The PBT composition according to claim 1, wherein the recycled polyester is polyethylene terephthalate, polytrimethylene terephthalate or polybutylene terephthalate.

4. The PBT composition according to claim 1, wherein the crystallization temperature (Tc) of the PBT composition is higher than 183° C.

5. The PBT composition according to claim 1, wherein the composition comprises less than 0.1 mol % of ethylene glycol (EG) residue.

6. The PBT composition according to claim 1, wherein the composition comprises less than 0.1 mol % of diethylene glycol (DEG) residue.

7. The PBT composition according to claim 1, wherein the intrinsic viscosity (IV) of the composition is within a range of 0.5 dL/g to 1.5 dL/g.

8. A method for forming a PBT composition from a recycled polyester, comprising the following steps:
(1) providing the recycled polyester having a structure of formula (i),

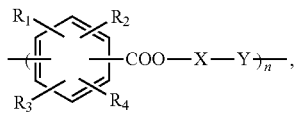
formula (i)

where $R_1$, $R_2$, $R_3$ and $R_4$ are the same or different, and are hydrogen, alkyl having one to six carbon atoms, halogen, alkoxy having one to six carbon atoms, alkoxycarbonyl having two to six carbon atoms, nitrile, amino, sulfonyl, nitro or phenoxy, respectively; X is a divalent aliphatic hydrocarbyl having one to ten carbon atoms; Y is —OCO— or —O—; and n is an integer between 30 and 500;

(2) adding an alcohol to alcoholyze the recycled polyester into an oligomer or a monomer;
(3) under a negative pressure, adding 1,4-butanediol (1,4-BDO) in portions to carry out transesterification reaction with the oligomer to obtain a butylene terephthalate prepolymer, which is bis(2-hydroxylbutyl) terephalate (BHBT), wherein the negative pressure is lower than 400 mbar; and
(4) at a pressure of less than 1.5 mbar, polymerizing the BHBT to obtain the PBT composition, wherein the change rate of crystallization heat flow of the PBT composition is greater than or equal to 200 mW/g-min, and the change rate of crystallization heat flow is measured according to a method set forth in ISO11357-3:2018.

9. The method according to claim 8, wherein in step (3), 1,4-BDO is added in 2 to 4 portions under the negative pressure to carry out transesterification reaction with the oligomer.

10. The method according to claim 8, wherein the recycled polyester is polyethylene terephthalate, polytrimethylene terephthalate or polybutylene terephthalate.

* * * * *